US012603784B2

(12) United States Patent
Laing et al.

(10) Patent No.: US 12,603,784 B2
(45) Date of Patent: *Apr. 14, 2026

(54) AUTHORIZATION OF STATES IN A STATEFUL SIGNATURE SCHEME

(71) Applicant: HEWLETT-PACKARD DEVELOPMENT COMPANY, L.P., Spring, TX (US)

(72) Inventors: Thalia May Laing, Bristol (GB); Maugan Villatel, Bristol (GB); Pierre Louis Robert Belgarric, Bristol (GB); Adrian John Baldwin, Bristol (GB); Adrian Laurence Shaw, Bristol (GB); Remy Husson, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 18/453,059

(22) Filed: Aug. 21, 2023

(65) Prior Publication Data

US 2024/0097914 A1 Mar. 21, 2024

(30) Foreign Application Priority Data

Sep. 16, 2022 (GB) ..................................... 2213627

(51) Int. Cl.
*H04L 9/32* (2006.01)

(52) U.S. Cl.
CPC .................................. *H04L 9/3247* (2013.01)

(58) Field of Classification Search
None
See application file for complete search history.

(56) References Cited

U.S. PATENT DOCUMENTS

| | | | | |
|---|---|---|---|---|
| 10,341,116 B2 * | 7/2019 | Liu | | H04L 9/3236 |
| 10,511,447 B1 * | 12/2019 | Lakk | | H04L 9/3297 |
| 10,608,824 B1 * | 3/2020 | Praus | | H04L 9/083 |
| 11,107,048 B2 * | 8/2021 | Gopinath | | G06Q 20/065 |
| 12,267,437 B2 * | 4/2025 | Kampanakis | | H04L 9/3247 |
| 12,309,298 B2 * | 5/2025 | De Feo | | H04L 9/3271 |
| 12,423,684 B2 * | 9/2025 | Pagter | | H04L 9/085 |
| 2011/0179281 A1 * | 7/2011 | Chevallier-Mames | | |
| | | | | H04L 9/3236 |
| | | | | 713/181 |
| 2018/0300693 A1 * | 10/2018 | Gopinath | | G06Q 20/4016 |
| 2020/0028685 A1 * | 1/2020 | Schroeder | | H04L 9/3242 |

(Continued)

OTHER PUBLICATIONS

State Management for Hash-Based Signatures.

*Primary Examiner* — Backhean Tiv
(74) *Attorney, Agent, or Firm* — Quarles & Brady LLP

(57) ABSTRACT

In an example, a computing device is described. The computing device comprises an interface to receive a request from a signer for a state. The state is to be used as an input to generate a key under a stateful signature scheme. The computing device further comprises a processor. The processor is to identify an available state that the signer is authorized to use in response to the request received via the interface. The available state is identified from a set of states that can be used by the signer to maintain statefulness of the stateful signature scheme. The processor is further to instruct a reply to be sent to the signer via the interface. The reply comprises an indication of the state that the signer is authorized to use.

18 Claims, 8 Drawing Sheets

(56)     References Cited

U.S. PATENT DOCUMENTS

| | | | |
|---|---|---|---|
| 2020/0351074 A1* | 11/2020 | Wood ..................... | H04L 9/0861 |
| 2021/0306155 A1* | 9/2021 | Sastry ................... | H04L 9/3236 |
| 2022/0078024 A1* | 3/2022 | Misoczki .............. | G06N 10/00 |
| 2022/0086009 A1* | 3/2022 | Vacek ................... | H04L 9/0877 |
| 2023/0299972 A1* | 9/2023 | Villatel ................ | H04L 9/3247 |
| | | | 713/176 |
| 2024/0080204 A1* | 3/2024 | Van Vredendaal ... | H04L 9/3247 |
| 2024/0097884 A1* | 3/2024 | Laing ................... | H04L 9/0816 |
| 2024/0097905 A1* | 3/2024 | Laing ................... | H04L 9/3228 |
| 2024/0097913 A1* | 3/2024 | Laing ................... | H04L 9/0894 |
| 2024/0097914 A1* | 3/2024 | Laing ................... | H04L 9/0643 |
| 2024/0179010 A1* | 5/2024 | De Santis ............. | H04L 9/3239 |
| 2024/0413994 A1* | 12/2024 | Sukhomlinov ....... | H04L 9/3247 |
| 2025/0038962 A1* | 1/2025 | Laing ................... | H04L 9/3255 |
| 2025/0254049 A1* | 8/2025 | Laing ................... | H04L 9/3234 |

\* cited by examiner

300

500

AUTHORIZATION OF STATES IN A STATEFUL SIGNATURE SCHEME

BACKGROUND

A cryptoprocessor may use a private key to sign data. A verifier may use a public key associated with the private key to verify that the data was signed by the cryptoprocessor.

BRIEF DESCRIPTION OF DRAWINGS

Non-limiting examples will now be described with reference to the accompanying drawings, in which.

DETAILED DESCRIPTION

Disclosed herein are computing devices, machine readable media and methods to authorize a state in a stateful signature scheme.

As used herein, a stateful signature scheme refers to use of a function (e.g., a hash function in a stateful hash-based signature scheme) to construct a one-time signature (OTS) private key for use by a signer to produce a signature under the scheme. Such a signature scheme is considered stateful by virtue of the OTS private key generated under the scheme being single-use and ensuring that the OTS private key is not ever reused to sign data. Reusing an OTS private key of a stateful signature scheme may destroy the security of the scheme.

It may be necessary to prepare for the possibility that a signer such as a cryptoprocessor holding a private seed value used for generating an OTS private key may fail during the lifetime of the signer by introducing resiliency to the signing ecosystem. This may be relevant if the private seed value is to be used to generate OTS private keys over a long time period and/or replacing the associated public key would be difficult.

A copy of the private seed value and a latest state used as an input to generate an OTS private key could be stored in a secure alternate location. However, simply copying the private seed value and the state may create a risk of state reuse, thereby destroying the security. In an example scenario where a signer has a private seed value and a state, these two values may have been backed up on an alternative device. The signer may increment the state, sign a message and then fail, losing both the private seed value and latest state (e.g., the latest counter value). The signer may then recover the key from the backup, which holds the previous, non-updated state, thus resulting in state reuse next time the signer signs, resulting in loss of all security.

Examples described herein provide an approach to provide resiliency in a stateful signature scheme whilst removing the chance of state reuse. In an example, a signer may request a state from an entity that coordinates available states of the stateful signature scheme. In an example, the entity may respond to the request by authorizing the requesting signer to use an available state of the stateful signature scheme. Thus, the entity may ensure that multiple signers under the same stateful signature scheme do not reuse a state to generate an OTS private key.

Figure 1:
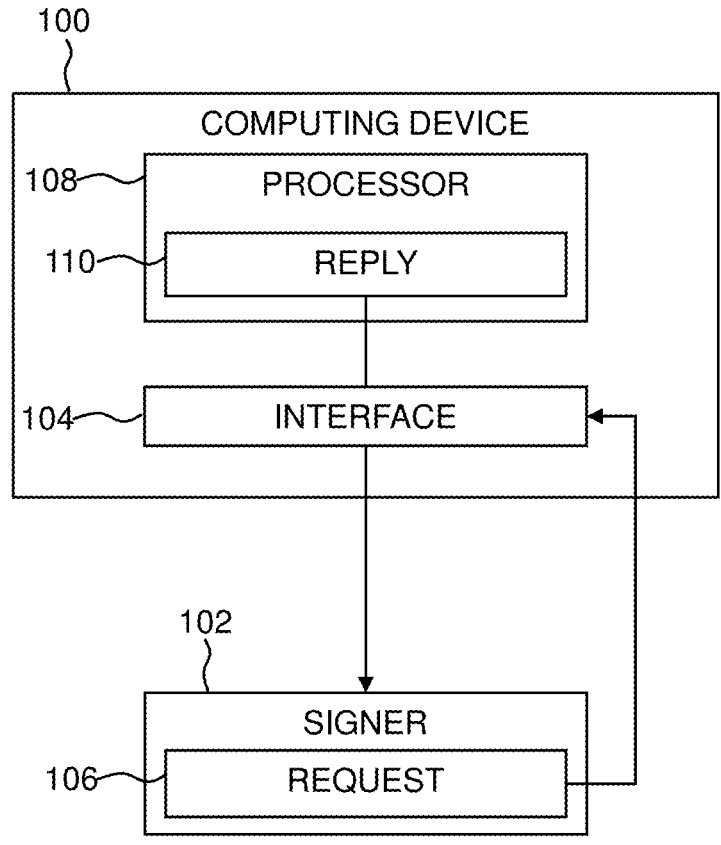
FIG. 1 is a schematic drawing of an example computing device to authorize a state in a stateful signature scheme.

FIG. 1 is a schematic drawing of an example computing device 100 to authorize a state under a stateful signature scheme.

A signer 102 is also shown in FIG. 1. As explained below, the computing device 100 may authorize the signer 102 to use a state in such a way that is resilient whilst removing the chance of state reuse under the stateful signature scheme.

The computing device 100 may interact with the signer 102, which may be an entity that is trusted to sign data (e.g., a message).

An example implementation may be that the signer 102 is to provide a signing function as part of a computing infrastructure to provide updates. Such computing infrastructure may be set up to transmit a message comprising a software or firmware update to a recipient such as a user device (e.g., a laptop, phone, tablet, Internet-of-Things (IoT) device, printer or other hardware). In this example implementation, the signer 102 may be a hardware security module (HSM) of the computing infrastructure and the HSM is to sign the message comprising the update using an OTS private key under the stateful signature scheme. Thus, the recipient may receive an authentication path provided by the signer 102, as part of the signature, to facilitate verification of the message.

Upon the signing procedure being completed, the computing infrastructure may send the (signed) message to the recipient, which may allow the recipient to verify the message is authentic (e.g., it originated from a trusted source) so that the recipient may proceed to implement the software or firmware update according to the code.

The computing device 100 comprises an interface 104 to receive a request 106 from the signer 102 for a state. The requested state is to be used (by the signer 102) as an input to generate a key (e.g., a signing key) under the stateful signature scheme. The computing device 100 may take the role of a coordinator of state under the stateful signature scheme, as described in more detail below.

Some examples of how the signer 102 may generate a key are now described.

In some examples, the key (also referred to herein as a signing key) is generated by inputting a seed (e.g., a private seed value from the seed key pair of a stateful signature scheme) and an available state (such as an unused value within the state space of the stateful signature scheme) to a key generator (also referred to herein as a key generation function). The key generator is implemented by the signer 102. The resulting key may be referred to as a one-time use private key (e.g., an OTS private key in the Leighton-Micali Hash-based Signature Scheme (LMS), where the state used to generate the OTS private key is known as the leaf number in LMS). Ensuring that an OTS private key is used once (since the state is unique and not reused to generate a key) may maintain statefulness of a stateful signature scheme.

Example stateful hash-based signature schemes such as the Leighton-Micali Hash-based Signature Scheme (LMS) and the eXtended Merkle Signature Scheme (XMSS) specify that the signer is to maintain a state, which updates every time a signature is produced. The state is chosen from a finite set. For example, the state may be a counter which runs from 0 to $2^{20}-1$ for a Merkle tree of height 20 (where the tree height defines the number of states that are initially available under the stateful signature scheme prior to signing any messages). This state is used in conjunction with a private seed value to produce a one-time signing (OTS) private key, which is used to produce a signature. If the state, and therefore the OTS private key, is repeated and used to sign two distinct messages, the security of the scheme collapses. Thus, state management is a relevant consideration for maintaining the security of the scheme. In the examples of LMS and XMSS, the state is a counter (normally used in order e.g., starting at 0, 1, 2 and so on). As the number of states is finite, there is an upper bound on the number of signatures that can be produced for a given seed key pair (comprising a private seed value/key and an associated public key) and this upper bound is to not be exceeded.

In LMS, the seed used to derive the OTS private key is known as the signing key. Thus, any reference herein to a seed or private seed value may refer to a signing key in the context of LMS. However, as used herein, any reference to a key or signing key (in the context of producing a signature) may refer to an OTS private key such as used in LMS.

In some examples, the key generator is to generate the one-time use private key using a pseudorandom function (PRF). In some examples, an OTS private key may be generated from a seed (e.g., one_time_private_key=f(seed, i), where "i" is the state), where the function "f" may implement a PRF and/or a key derivation function (KDF) such as a hash-based message authentication code (HMAC)-based KDF (HKDF). However, any appropriate pseudorandom method may be implemented to generate the OTS private key from the seed and the state.

In use, the interface 104 may transmit data to or receive data from the signer 102. Such data may comprise the received request 106 and/or any reply by the computing device 100 to such a request 106. The request 106 may be in any appropriate format that can be understood by the computing device 100 so that the computing device 100 can interpret the request 106 and implement the functionality described below.

In some examples, the request 106 is for an available state, which is identified in the manner described below. However, the request may include other information such as an indication of: a number of requested states, an identity of a certain state that is requested, a timescale during which to use the state, etc., as described in more detail in the examples given below.

The computing device 100 further comprises a processor 108.

In some examples, the processor 108 may have access to instructions (e.g., stored in the computing device 100) readable and executable by the processor 108 to implement the functionality described herein.

The processor 108 is to identify an available state that the signer 102 is authorized to use in response to the request 106 received via the interface 104. The available state is identified from a set of states that can be used by the signer 102 to maintain statefulness of the stateful signature scheme.

A state may be considered to be available if the state has not been used as an input to generate a key under the stateful signature scheme. A state may be considered to be unavailable if the state has been used as an input to generate a key under the stateful signature scheme. Reusing the state to produce a signature destroys the security of the stateful signature scheme. In some examples, the computing device 100 may maintain its own record (e.g., a lookup table comprising the set of states, which may be stored in the computing device 100 or another device accessible to the computing device 100) of which states have been used to generate signatures and which states are currently authorized to be used by the signer 102 (or another signer authorized under the stateful signature scheme). In some examples, the computing device 100 may maintain its own record of which states are available (e.g., via a lookup table as described above). Whichever way the record is implemented, the computing device 100 may have the ability to ensure that state reuse is prevented such that a first signer is authorized to use an available state and a second signer is not authorized to use the same available state (unless authorization of the first signer is withdrawn, and the first signer is trusted to not use the state).

In other similar words, the computing device 100 has knowledge on which states (i.e., the set of states) are free to use under the stateful signature scheme to maintain statefulness of the stateful signature scheme. The computing device 100 may be used to coordinate a signer or multiple signers under the same stateful signature scheme, as explained herein.

Statefulness of the stateful signature scheme may be maintained because the computing device 100 may ensure that an available state is used to produce a signature once and the state is not used again by the signer 102 (which is trusted to not reuse an available state) or any other signer under the stateful signature scheme.

The processor 108 is further to instruct a reply 110 to be sent to the signer 102 via the interface 104. The reply 110 comprises an indication of the (available) state that the signer 102 is authorized to use. The reply 110 may be in any appropriate format that can be understood by the signer 102 so that the signer 102 can interpret the reply 110 and use the available state indicated by the reply 110. In some examples, the indication may identify the available state by its value such as 0, 1 or 2, etc., which is to be input to a key generator implemented by the signer 102 to generate the key.

In some examples, the request 106 and the reply 110 may be transmitted via an authenticated channel. For example, the request 106 and the reply 110 may be signed by its respective transmitting entity (i.e., the signer 102 and the computing device 100) such that the associated receiving entity (i.e., the computing device 100 and the signer 102) can authenticate the request 106 or reply 110, respectively.

The ability to authorize a signer, within a set of signers, to use an available state without risking state reuse (by any of the set of signers) in accordance with certain examples described herein may avoid the need to implement a more complex backup system which may involve producing large signatures as a result of there being multiple signers. Using the computing device 100 to coordinate which signer, of the set of signers, is authorized to use an available state may allow smaller signatures to be produced for a given size of the state space underpinning the stateful signature scheme. In some examples where a recipient of a signed message is resource constrained, such as may be the case in a secure boot procedure implemented by the recipient, the recipient may need less time to perform signature verification as a result of the small signature size.

In some examples, to facilitate verification of a signed message, the signer 102 may send the (one-time) signature and information (i.e., an authentication path) needed for verifying the signature to allow the verifier to verify that a candidate public key derived from the signature is contained in a Merkle tree. The authentication path for a given state indicates the nodes and/or public keys contained in the Merkle tree for the stateful signature scheme to allow a root public key for the stateful signature scheme to be computed.

In some examples, to verify the signed message, the verifier may compute a candidate OTS public key. The verifier can then verify that the candidate OTS public key is contained in the Merkle tree with the public key as its root node. In this regard, the verifier may compute a candidate OTS public key from the signature and the message. Using the state value and the authentication path, the verifier may verify that the candidate OTS public key is contained in the Merkle tree with the public key as its root node. If the verification procedure is successful, the verifier accepts the signature as valid and the message as authentic.

In some examples, by receiving a request for an available state, the computing device 100 may be enabled to act as a coordinator to prevent state reuse under the stateful signature scheme. Using a request to facilitate the coordinator functionality as described in certain examples may reduce complexity of state management across multiple signers.

In some examples, the signer 102 may comprise a cryptoprocessor (e.g., a signer) to perform a cryptographic operation such as signing data with a private key, encrypting data, etc. A cryptoprocessor may implement a level of security that specifies whether the cryptoprocessor is to do anything with data stored therein (e.g., keying material) in response to an event such as a physical attack on the cryptoprocessor. The level of security specified for the cryptoprocessor may depend on the use case of the cryptoprocessor.

Examples of cryptoprocessors (sometimes referred to as secure cryptoprocessors) that may implement a physical security mechanism include devices such as a cryptographic module or hardware security module (HSM). In some examples, the level of security provided by a cryptoprocessor may comply with a standard such as specified by the Federal Information Processing Standards (FIPS) Publications 140-2 or 140-3.

Figure 2:
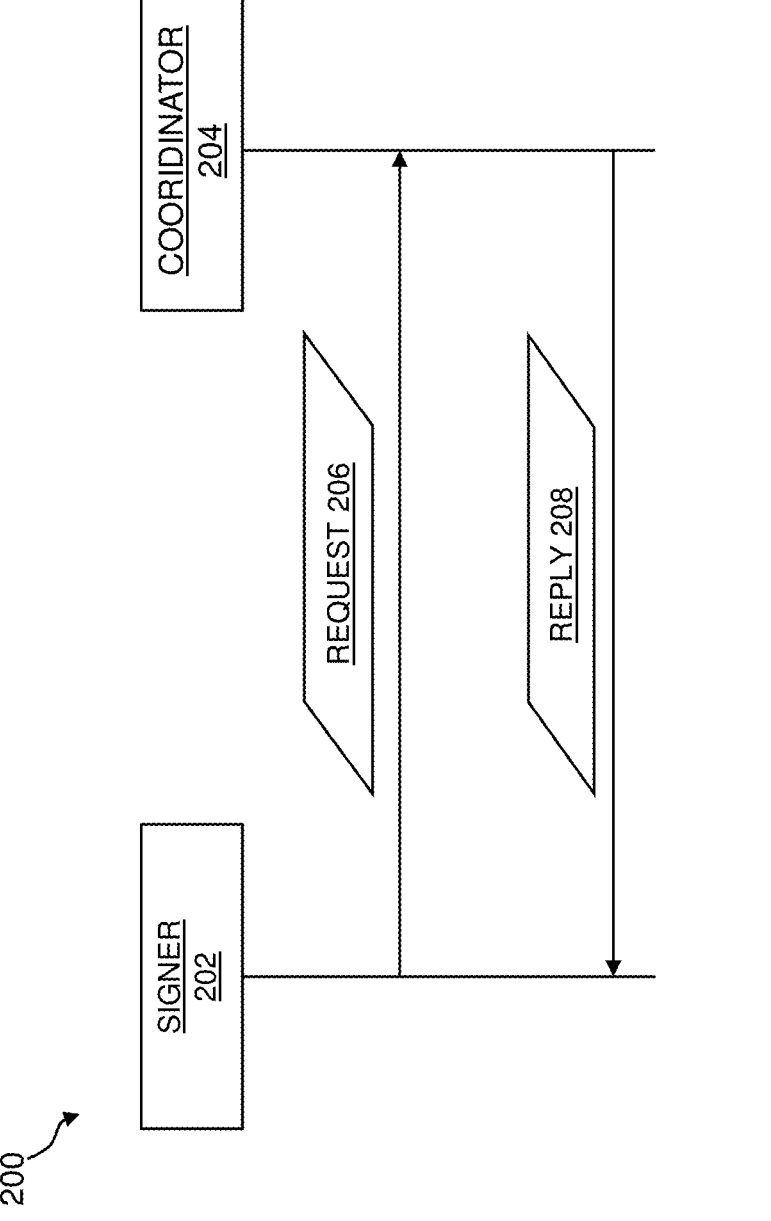
FIG. 2 is a flowchart of an example method of authorizing a state in a stateful signature scheme.

FIG. 2 is a flowchart of an example method 200 of authorizing a state in a stateful signature scheme. In some examples, a part of the method 200 may be implemented by the computing device 100 or other computing devices or machine-readable media described herein. The flowchart depicts interactions between a signer 202 and a coordinator 204. The coordinator 204 may implement the functionality of the computing device 100 of FIG. 1 and/or related examples.

In the method 200, the signer 202 is to send a request 206 (as described in relation to FIG. 1) to the coordinator 204. In response, the coordinator 204 is to send a reply 208 (as described in relation to FIG. 1) back to the signer 202. Although a single signer 202 is shown, multiple signers may interact with the same coordinator 204 in a similar way to the signer 202.

Further implementation details of the flowchart are described below.

In the example where the stateful signature scheme is a hash-based stateful signature scheme, the state of the hash-based signature scheme may be a counter defined by the function $0 \leq x \leq 2^h - 1$ where h is the height of the Merkle tree underpinning the scheme. The number of states under the stateful signature scheme corresponds to the value $2^h$.

The stateful signature scheme is implemented by the signer 202 (although there are potentially multiple signers) and a single coordinator 204. Thus, there may be n signers in the set, S. The set of signers, S, is expressed by $S=\{s_1, s_2, \ldots, s_i, \ldots, s_n\}$. Each of the signers, s, stores a copy of the private seed value associated with the stateful signature scheme. The private seed value may be provided to the signers in any appropriate way, providing the private seed value is kept confidential to the signers.

The coordinator 204 may be considered to be a unique entity in the signing ecosystem implementing the stateful signature scheme. In this regard, the coordinator 204 is trusted and may authenticate itself to each of the signers. The coordinator 204 may maintain a record such as a lookup table of all available states in the state space for the stateful signature scheme associated with the private seed value.

To prevent signers being incorrectly informed about states (e.g., by an attacker) or to prevent the coordinator 204 from processing incorrect requests for states, there may be an authenticated channel between the coordinator 204 and each signer 202. In some examples, each entity (the coordinator 204 and each signer 202) may have an asymmetric signing key pair. Thus, the coordinator 204 may have a key pair (Cpk, Csk), with each signer 202 securely provided with the public key Cpk that is associated with the private key Csk. Each signer $s_i$ may have a key pair $(Pk_i, Sk_i)$, with the coordinator 204 securely provided with all the public keys $Pk_i$ that are associated with the corresponding private keys $Sk_i$. In some examples, the coordinator 204 has a set of symmetric keys (i.e., a dedicated symmetric key for each signer), which may be used by the signer 202 and coordinator 204 to compute a message authentication code (MAC) to include with the request 206 and reply 208, respectively.

An example procedure for requesting an available state is now described.

In advance of producing any signatures, a signer 202 may communicate with the coordinator 204 and request a state (or a set of states). In some examples, the request 206 may define how many states are needed and/or a requested time period over which the states may be needed to be reserved by the signer 202.

In some examples, a signer $s_i$ request may be in the following form: Request=$(x, t')$, $(Sig_{sk_i}(x, t'))$, where x is the number of states being requested (e.g., a set of ten states), t' indicates a time period during which the signer 202 would like to use the requested state(s) to sign signature(s) and $Sig_{sk_i}$ refers to a signature (or instead a MAC tag could be included) on the request 206 using the key associated with signer $s_i$.

An example procedure for responding to the request 206 is now described.

The coordinator 204 may review the request 206 and consult its lookup table, which may indicate which states are presently available. Upon reviewing the lookup table, the coordinator 204 may identify a set of states that are not yet allocated to a signer and have not yet been used by any signer. The coordinator 204 may send the identified set of states that the signer 202 is authorized to use to the signer 202 via the reply 208. In some examples, the reply 208 comprises a time by which the identified states are to be used or returned by the signer 202.

For example, the coordinator's 204 reply may be in the following form: Reply=$(X, t)$, $(Sig_{Cpk}(X, t))$, where X identifies a set of available states (such as the state values or an indication thereof) as determined by the coordinator 204, t indicates a time period (e.g., a lease time) during which the signer 202 is permitted to use the state(s) X to sign signature (s) and $Sig_{Cpk}$ refers to a signature (or instead a MAC tag could be included) on the reply 208 using Csk, or a shared symmetric key.

In some examples, X may comprise x states, as requested by the signer 202. In some examples, the coordinator 204 may authorize a different number of states to those requested (e.g., the set X may comprise fewer states than the request set, x) at the coordinator's 204 discretion. In some examples, the time indication, t, may be the same as the requested time indication, t'. Similarly, this decision may be at the coordinator's 204 discretion.

In some examples, the signature on the reply 208 may ensure that the signer 202 can authenticate that the reply 208 came from the coordinator 204 (and not, for example, an attacker trying to masquerade as the coordinator 204 so as to lease the same state to multiple signers in an attempt to influence state reuse).

In some examples, the coordinator's 204 reply may include other information, such as a time before which the states cannot be used. Such information may facilitate management of the states under the stateful signature scheme.

In some examples, the coordinator 204 may label the states in X in its lookup table as on lease and indicate the time at which point the lease expires. In some examples, the lookup table may also include information such as which signer (i.e., the identity thereof) leased the states, $s_i$, and any other information (such as, for each state, what other states were included in the same lease set X).

An example of the signing procedure is now described.

At any time until indicated by the time t, the signer 202 may be free to produce signatures using its copy of the private seed value and any available states in the state set X. The signer is to produce one signature per state in X and may keep track of which states have and have not been used to avoid state reuse.

An example of the procedure when the lease ends is now described.

When time t is reached, the signer 202 is no longer authorized to use any further states in set X to produce signatures.

Before time t, or when time t is reached, the signer 202 may inform the coordinator 204 about which states in X have been used to produce a signature and/or which states have not been used. This may assume that the signer 202 is trusted to provide accurate information regarding which states have and have not been used. This may also assume that an early (prior to time t) confirmation of which states have not been used results in an immediate end of the lease.

The signer 202 may inform the coordinator 204 about which states have been used before time t is reached. This may be useful if the coordinator 204 enforces an upper bound on the number of states the signer 202 can have on lease at any point in time. In some examples, by registering a state as used, the signer 202 may then be able to request new states. In some examples, if the signer 202 wishes to maintain a sufficiently large set of unused states to enable the signer 202 to most likely have a state available to sign with, informing the coordinator 204 about used states on a regular basis may allow the coordinator 204 to provide the signer 202 with new available states on demand.

Thus, in some examples, an update sent by the signer 202 to the coordinator 204 may inform the coordinator 204 about which states have been used as well as comprising a request for new states. In some examples, if the signer 202 sends an update to inform the coordinator 204 which states have not been used before time t is reached, this update may be interpreted as signer 202 cancelling the lease on these states and therefore the signer 202 cannot use these states after the coordinator 204 has been informed (even if the time t has not been reached). For example, at time t, the signer 202 may send a message to the coordinator 204 comprising the information: $(X_{used}, X_{unused})$, $(Sig_{sk_i}(X_{used}, X_{unused}))$ where $X_{used}$ is the set of states that were used before time t, $X_{unused}$ is the set of unused states and a signature $Sig_{sk_i}$ is applied on the message.

In some examples, the update comprising the set $X_{unused}$ may be sent by the signer 202 to the coordinator 204 if the coordinator 204 recorded which states were leased in the same set, thereby allowing the coordinator 204 to deduce elements in $X_{used}$ given $X_{used}=X \backslash X_{unused}$).

In some examples, the coordinator 204 may label the states in $X_{unused}$ in their lookup table as being used (rather than being on lease) and may release the states in $X_{unused}$. In this case, the signer 202 may inform the coordinator 204 (and be trusted to do so) about which states have not been used (and this informing may be performed in an authenticated manner, e.g., to avoid a malicious actor masquerading as the signer and wrongly informing the coordinator 204 that a used state has not been used).

In some examples, the ability of the coordinator 204 to label leased states as unused after receiving confirmation may be useful. This is because the set of states is finite and so marking unused states as used may reduce the overall capacity of signatures that can be produced with a given seed key pair (comprising the private seed value) associated with the stateful signature scheme. Accordingly, resiliency of the state may be provided whilst reducing state wastage.

In some examples, if the signer 202 may not reach out to the coordinator 204 to inform the coordinator 204 about states that have not been used and time t has passed, the coordinator 204 may send a communication to the signer 202 reminding the signer 202 of its deadline to provide such information. Such a communication may request confirmation on which states have and have not been used. If the coordinator 204 does not receive a reply, the coordinator 204 may assume that the signer 202 has failed and, as a result, may mark all states in X as being used, to avoid the potential for state reuse. In some examples, in order to mark a previously leased state as unused, the coordinator 204 needs to receive an authenticated confirmation that the state has not been used, otherwise the state is to be marked as used.

An example of a lease extension procedure is now described.

In some examples, at any point, the signer 202 may request a lease extension on a previously leased set of states. Such a request may be performed by the signer 202 sending a new request specifying the states they already have on lease and requesting a new time $t_{ext}'$ within which to use the leased states as follows: Request=$(X, t_{ext}')$, $(Sig_{Sk_i}(X, t_{ext}'))$. In response, the coordinator 204 may look up the states in X in its lookup table, determine that they are already on lease to signer $s_i$, and then extend the time of the lease (via a reply) at the discretion of the coordinator 204.

An example now describes the resiliency of the coordinator 204.

It might be possible to consider that examples described herein move the single potential point of failure from the signer 202 to the coordinator 204. However, the coordinator's 204 lookup table may not contain any private information. The lookup table may be consistent and set up to avoid rollback attacks. Thus, the lookup table could be stored in a resilient manner across multiple devices (e.g., to reduce the risk of failure affecting the lookup table). For example, a redundant array of independent disks (RAID) based storage scheme could be used to store the lookup table.

To prevent the coordinator's 204 private key (Csk, or any symmetric keys) from being a single point of failure, such keys could be stored across multiple devices using a secret sharing scheme, for example, and recovered whenever they need to be used (or used in a distributed manner, such as via a threshold signature scheme where a threshold number of devices need to agree before recovery is permitted).

In some examples, if the coordinator 204 is temporarily unavailable, the signer 202 may continue to produce signatures using states they have already been leased. Thus, the coordinator 204 being down may not have as much impact as a single signer being down.

Some further examples of implementations are described below.

In some examples, rather than sending a request for a number of states, x, the signer 202 may request a specified set of states. Such may be the case if, for example, the signer 202 has previously generated information in a Merkle tree that makes signing with certain state values faster. In such a case, the coordinator 204 may consider the requested states in its lookup table and either lease the requested states to the signer 202 or deny the request if requested states have been previously used or are on lease.

In some examples, the coordinator 204 may preempt a request from the signer 202 and lease a set of states without a request being sent. Such may be the case if the signer 202 is routinely expected to produce period signatures; the coordinator 204 may then periodically lease states to the signer 202. Leasing states periodically, rather than leasing multiple states in one transaction, may reduce the chance of unused states being marked as used if the signer 202 fails.

The method 200 may therefore allow the coordinator 204 to manage the states that are to be issued to the signer 202. By using a request 206, the signer 202 may be able to obtain available states on demand and make additional requests for states in case the number of messages that need to be signed within a time period is different to expectation. Further, the request 206 may facilitate further details to be requested beyond a simple request for an available state. For example, multiple states may be requested, certain specified states may be requested and/or a time period over which the states are needed may be indicated. In some examples, by using the reply 208, the coordinator 204 may interact with the signer 202 to ensure that the signer 202 has accurate information about which states are available, while providing the coordinator 204 with control over how many states the signer 202 can have at any one time and/or the amount of time the signer 202 is authorized to used such states.

In these examples, it has been described how a single coordinator 204 implements the functionality to control state usage by the signer 202 and any other signers under the stateful signature scheme.

An example extension to this scheme is described below where the coordinator 204 is part of a distributed computing system to manage available state distribution.

Figure 3:
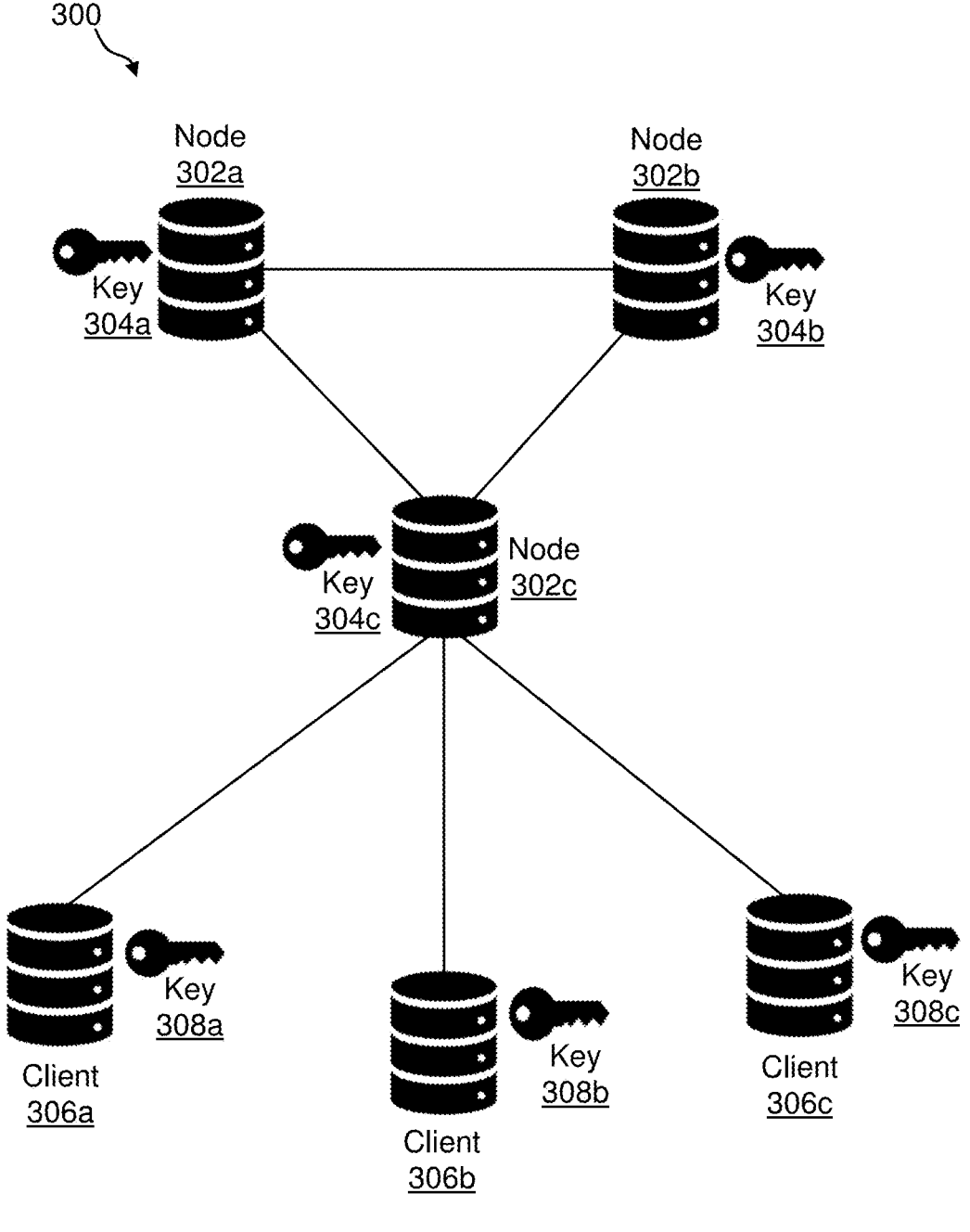
FIG. 3 is a schematic drawing of an example distributed computing system to authorize a state in a stateful signature scheme.

FIG. 3 is a schematic drawing of an example distributed computing system 300 to authorize a state in a stateful signature scheme. The example distributed computing system 300 comprises three nodes 302*a-c* (such as blockchain nodes to implement a blockchain-based protocol to validate transactions on a blockchain ledger, which may be stored on at least some nodes of the distributed computing system 300). For simplicity, three nodes 302*a-c* are shown although in reality there may be any appropriate number of nodes as needed to maintain security and reduce the risk of potential attacks. Each node 302*a-c* is communicatively coupled to each other node 302*a-c*. Each node 302*a-c* has its own associated private key 304*a-c*, respectively, e.g., for signing blocks on the blockchain ledger.

In some examples, the functionality of the coordinator 204 is implemented by a node 302*a-c* of the distributed computing system 300. Thus, in some examples, the coordinator 204 comprises a node (such as a blockchain node) of a distributed computing system 300. Further implementations are described below.

The system 300 further comprises three clients 306*a-c* (e.g., blockchain clients). Each client 306*a-c* may implement the functionality of a signer 202. The clients 306*a-c* are communicatively coupled to the node 302*c*, which may serve as a gateway to the blockchain nodes 302*a-c*. Each client 306*a-c* has an associated private key 308*a-c* to sign requests for submission to the blockchain. For simplicity, three clients 306*a-c* are shown although in reality there may be any appropriate number of clients 306*a-c* depending on how many signers are needed to implement the stateful signature scheme. The network architecture is an example and other architectures are possible.

In some examples, multiple signers 202 (i.e., clients 306*a-c*) may store the private seed value. Before signing a message, a signer 202 may submit a request 206 (e.g., comprising a transaction request) to a blockchain (e.g., via node 302*c* implementing the functionality of the coordinator 204) requesting use of an available state under the stateful signature scheme. Similar to the functionality of the coordinator 204, the node 302*c* may decide (e.g., by virtue of attempting to process a transaction on the blockchain) whether or not to accept the request 206 (e.g., if a blockchain contract is satisfied) and reply 208 with the available state(s) and any other information. The blockchain may provide a check on whether or not to accept the request 206. If the transaction is accepted (e.g., based on a blockchain protocol to decide whether to accept transactions), the signer 202 is allowed to use an available state (as indicated by the accepted transaction) to produce a signature. If a state has already been spent (making the state unavailable), the transaction requesting the state is not accepted, thus avoiding state reuse.

The stateful signature scheme may be resilient by virtue of there being multiple signers with the private key and none of the signers maintain the state. Instead, the signers 202 may request to use a state (or a set of states) and are authorized to produce a signature based on the state once their request has been accepted on the blockchain.

Further implementation details of how signer requests may be processed are described in the examples provided below.

In some examples, before producing a signature based on the private seed value, a signer 202 is to request a state, or a set of states, that the signer 202 can use in the signing procedure. The blockchain stored by the nodes 302*a-c* is used to maintain a record of the states provided to the signers.

In some examples, when preparing to sign, a signer 202 is to query the blockchain (e.g., via the node 302*c*) to identify a currently available state and then send a blockchain transaction to reserve the state.

To do this, each signer 202 may have a blockchain signing key (e.g., and be able to generate and sign blockchain transactions). In this regard, the signer 202 is a blockchain client with the ability to request transactions to be added to the blockchain ledger. The signer 202 may not use a state until the transaction requesting the state has been validated and included in the blockchain. Appropriate rules in the smart contract implemented by the blockchain may be set such that the same value cannot be reserved twice by a different signer or even the same signer. Such logic may correspond to preventing double spending in crypto-currency blockchains. That is, if the state has been spent (i.e., used to derive a signature) in the past, the transaction is not accepted. Because all transactions in the blockchain are ordered, if two different signers try to reserve the same state at the same time, just one of the transactions is valid (i.e., the first one to be processed).

In some examples, in order to ensure the unicity of the state, the blockchain is designed to be forkless, as any fork could lead to different signers reusing the same state. The forkless assumption may be maintained by a consensus protocol, which is selected adequately chosen to provide a specified security level.

As an example, consider the blockchain network of three nodes 302a-c depicted by FIG. 3. A possible consensus protocol may specify that every block (containing the transactions accepted and included in the ledger) is to be signed and approved by at least two out of the nodes 302a-c. Thus, as long as at most one node is compromised at a given time, then the blockchain is forkless and transaction processing is trusted.

Some examples for querying a transaction status are now described.

Three possible ways for the signer to get the status of a sent transaction are now described, which include: (i) getting the transaction status, (ii) querying the blockchain state and (iii) retrieving the block in which the transaction was included.

In some examples, after sending a transaction, the blockchain Application Programming Interface (API) may allow to query the status of the transaction. If retrieving the status this way, security protocols may be put in place to ensure the integrity of the API reply.

In some examples, querying the status from the blockchain state may need the smart contract to store the relevant data in the blockchain state, and for the signer 202 to query that data through the appropriate method. In some examples, relevant security protocols may be put in place to ensure the integrity of the blockchain API reply for the state query.

In some examples, the signer 202 may query the block in which its transaction was included. With the consensus example previously given, the block may be signed by at least two of the nodes 302a-c and contain the transaction sent by the signer. Verifying that the block signature is correct and that the transaction is indeed in the block may allow the signer 202 to know that the transaction is valid and thus that the reservation was successful.

Some examples of further implementation details are described below.

In the description above, the signer 202 may first query the blockchain to learn the current state and then send a blockchain transaction reserving the next appropriate state. It is to be noted that the states being requested for use in the stateful signature scheme may not necessarily need to be used in the order of a state. Instead of identifying the most recent state and requesting the next, the signers 202 could, for example, randomly (or otherwise) choose a state within the possible state space (under the stateful signature scheme) and send a request for this state. As the blockchain state maintains the history of all previously used states, the transaction is approved if the requested state has not been used. Such an approach may reduce the chance of multiple signers requesting the same state at the same time.

In the description above, the signers 202 may request a single state in a transaction. Depending on how frequently each signer 202 is to sign, and dependent on how frequently the signers are anticipated to fail (when a signer 202 fails in a system, all states reserved by the failed signer 202 are lost), the signer 202 may request a set of states 202 in a single transaction. For example, the signer 202 may request the set of twenty states {x,x+1, . . . ,x+19}, or all states in the state space modulo 2. Such an approach may be more efficient if a signer produces many signatures in a short time period.

Each of these examples could be combined so that randomly chosen sets of (consecutive or non-consecutive) states may be requested.

In some examples, states may be transferred between different signers. For example, if an entity requests, and is granted, use of a large set of states (perhaps in anticipation of having to produce a large number of signatures) but then the states are no longer needed, another signer may request a transfer of the unused states to them. This may also occur as a transaction on the blockchain, as above.

A further example is to allow an architecture with two transactions, as described below.

The first transaction (referred to as a reserve transaction) may allow a signer 202 to reserve a (set of) state(s). A reserve transaction may mean that no other signers are to be allowed to reserve or use the states.

The second transaction may then either indicate when the state(s) have been used, or allow the signer 202 to release a state.

If the signer 202 produces a signature with a reserved state, the signer 202 may then send a consumed-true transaction, marking the state as used and prohibiting the state from future use.

If the signer 202 does not produce a signature with a reserved state, and wishes to release the state, the signer 202 may send a consumed-false transaction, thereby releasing the state(s) for other signers 202 to reserve.

Breaking the single transaction into two transactions such described above may allow signers 202 to release unused states, which may enable greater use of all states in the state space. However, if a signer 202 reserves states and then fails, all states are to be considered to be consumed.

If the blockchain keeps track of one set of states, then the number of blocks is expected be around or below the number of possible states. This may mean that it is possible to use the same LMS scheme to sign blocks instead of, for example, an elliptic curve cryptosystem (ECC).

The blockchain-based implementation may provide resiliency in a similar way to the coordinator 204. An example of a standardized quantum secure signature scheme is a hash-based stateful signature scheme. The blockchain-based implementation may allow signers to dynamically request (and as an extension, exchange) states for use in such a way that may increase confidence in the coordination function.

Accordingly, a single coordinator 204 (or a corresponding distributed coordinator function via a blockchain-based implementation as described above) may manage or control the states that are available to the signer 202 under the stateful signature scheme. The signer 202 may request a state from the coordinator 204. The coordinator 204 may then check its record (or use the blockchain function) for unused states (which also have not been assigned to other signers) and send an indication of the authorized state(s) to the signer 202, which may then produce a signature derived from the indicated state and the private seed value. The coordinator 204 may have additional functionality such as the ability to lease the state out for a specified time period, revoke the state, etc. In the case of a blockchain-implemented coordination function, a consensus protocol may increase confidence and reduce the impact of an attack on the coordination function.

Some examples relating to the above are now described.

Figure 4:
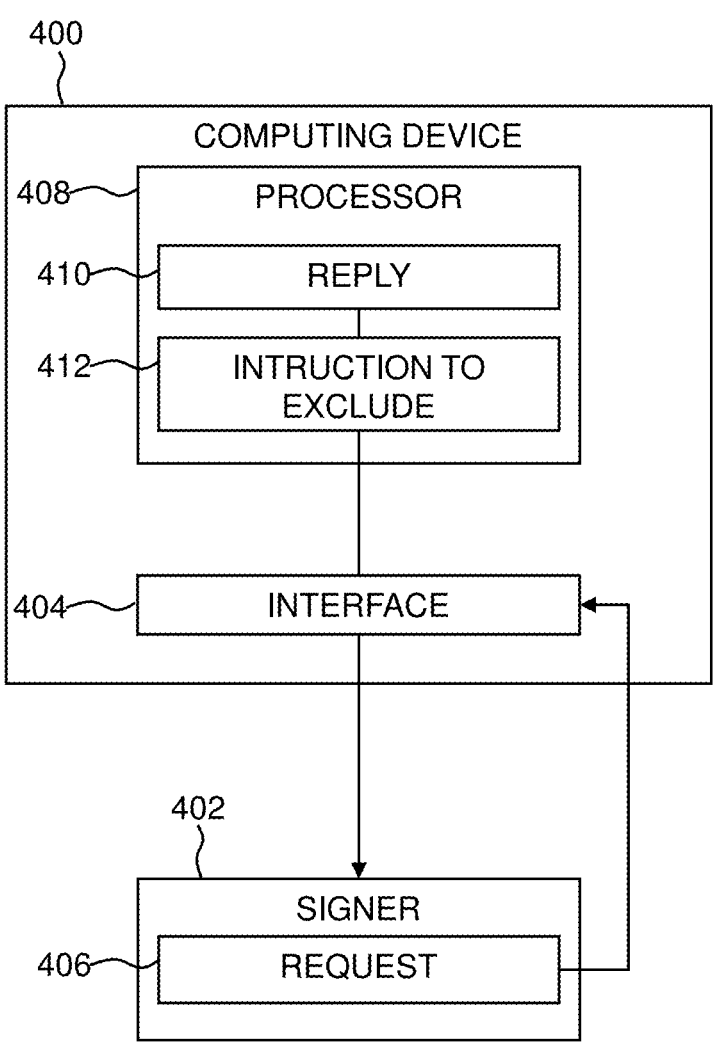
FIG. 4 is a schematic drawing of an example computing device to authorize a state in a stateful signature scheme.

FIG. 4 is a schematic drawing of an example computing device 400 to authorize a state in a stateful signature scheme. Reference numerals for features of the computing device 400 that are similar to or have corresponding functionality to features of the computing device 100 of FIG. 1 are incremented by 300. In this regard, the computing device 400 implements the same functionality as the computing device 100 and further functionality as described by the examples below.

In some examples, the processor 408 is to identify the available state by selecting a state from the set of states. The selected state is a state that has not yet been used as the input by the signer 402 (or any other signer) under the stateful signature scheme.

In some examples, the processor 408 is to delete the selected state from the set of states (e.g., from the computing device 400 itself or from a memory accessible to the computing device 400 storing the states) in response to authorizing the selected state to be used by the signer 402.

The record of the set of states (e.g., a lookup table) may be updated in response to the state being authorized for use by the signer 402. The computing device 400 may not learn if or when a signature is produced, so the computing device 400 may mark the state as unavailable the moment it is leased.

In some examples, the state is identified as being available if the state belongs to a subset of the set of states that is: authorized to be used by any signer; authorized to be used during a time period indicated by the request 406; authorized to be used exclusively by the signer, or a combination thereof. Thus, the computing device 400 may ensure that the identified state satisfies a condition before the state is indicated to the signer 402 via the reply 410. As indicated by the present example, there may be additional conditions as well as the availability of a state. For example, certain states may be reserved for a specified signer 402 and/or a time period over which the state can be used by the signer 402 may be determine whether or not the signer 402 can be authorized to use the identified state.

In some examples, the computing device 400 is a blockchain node to implement a blockchain. In this case, the request 406 comprises a blockchain transaction request. As a result of receiving the request 406, the processor 408 may determine whether the blockchain transaction request satisfies a contract (e.g., a smart contract) specified by the blockchain. As explained above, a transaction request may be accepted if a contract is satisfied. Such a contract may enforce that a state may be used once (and not presently authorized for use by another signer 402) to maintain statefulness of the stateful signature scheme. The signer 402 may be authorized to use the state upon satisfaction of the contract. Thus, in response to the contract being satisfied, the processor 408 may record the transaction request and blockchain state changes in a ledger of the blockchain; reach consensus on a new version of the ledger through a protocol implemented by the blockchain; and as a result, authorize the signer 102 to use the identified state. As noted above, the signer 402 may not be able to use the state to produce a signature until the blockchain transaction has been generated.

In some examples, the processor 408 is to determine a time period during which the signer 402 is authorized to use the available state and indicate the time period with the reply 410. The signer 402 is trusted to respect the indicated time period and not produce a signature based on the available state outside the indicated time period.

In some examples, the processor 408 is to, after authorizing the signer to use the available state, determine that the authorization to use the available state is to be withdrawn. The processor 408 is further to send an instruction 412 to the signer via the interface to instruct the signer 402 to exclude the available state from future use as the input.

In some examples, the signer 402 may not explicitly inform the computing device 400 that a state has not been used. In this case, the state is not then marked as available in the record, even if the lease has run out. The default may be that, unless the signer informs the computing device 400 otherwise, the computing device 400 is to mark the state as used. This functionality may be useful where the signer 402 could have used the state, and then failed before being able to inform the computing device 400 that the state has been used. By not making any assumption about whether or not the state has been used by the signer 402, the computing device 400 may default to the assumption that the state has been used (and not lease the state to any other signer 402 even after expiry of the original lease) to avoid the risk of state reuse.

Figure 5:
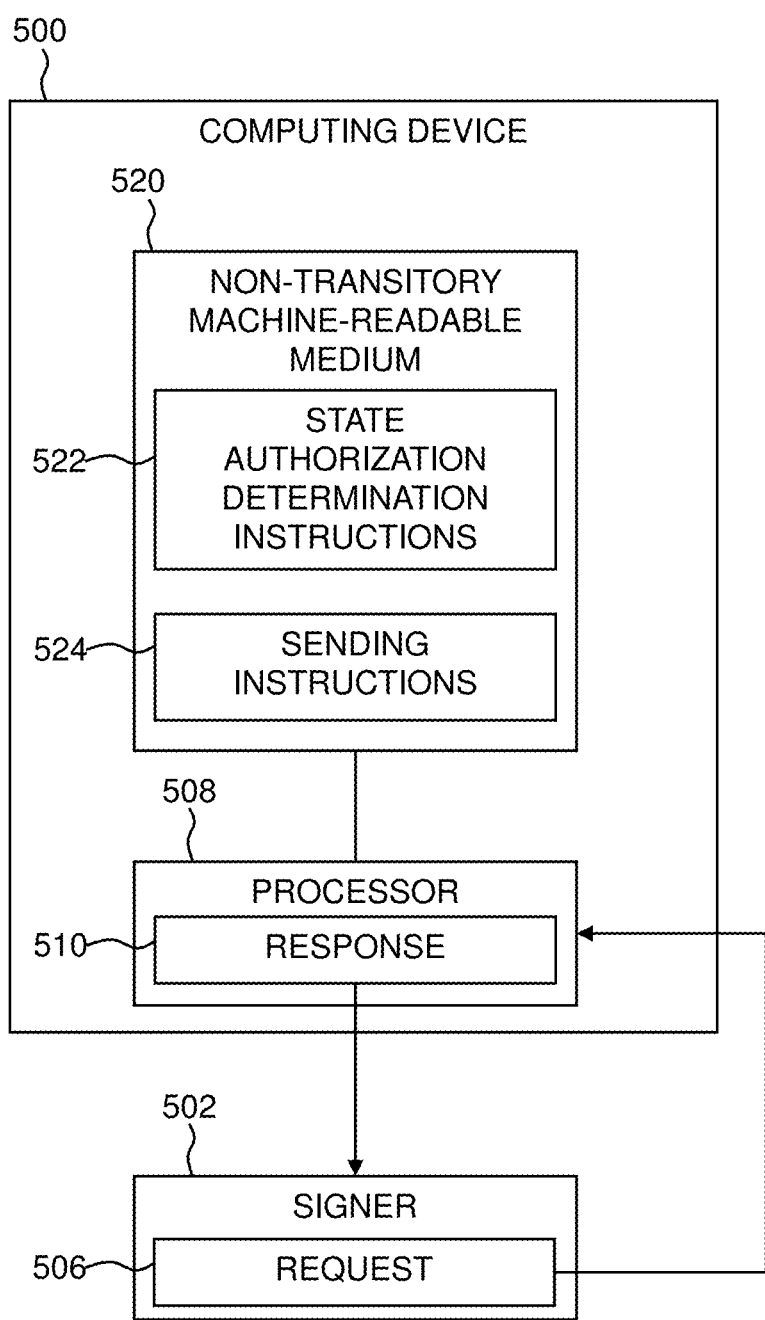
FIG. 5 is a schematic drawing of an example computing device to authorize a state in a stateful signature scheme.

FIG. 5 is a schematic drawing of an example computing device 500 to authorize a state in a stateful signature scheme. Reference numerals for features of the computing device 500 that are similar to or have corresponding functionality to features of the computing device 100 of FIG. 1 are incremented by 400. The computing device 500 may implement similar functionality to the computing device 100 (and provide similar technical results as described previously). Thus, further details of the features of the computing device 500 with similar functionality to the features of the computing device 100 can be understood with reference to the description of the computing device 100 and related examples.

The computing device 500 comprises a processor 508 and a non-transitory machine-readable medium 520.

As used herein, the term "non-transitory" does not encompass transitory propagating signals.

The non-transitory machine-readable medium 520 stores instructions readable and executable by the processor 508. The instructions comprise state authorization determination instructions 522 and sending instructions 524.

The state authorization instructions 522 are to instruct the processor 508 to determine an available state that a signer 502 is authorized to use as an input to generate a signing key under a stateful signature scheme. The available state is determined to be authorized if the available state belongs to a set of states that have not been authorized for use by any signer under the stateful signature scheme.

The sending instructions 524 are to instruct an indication of the available state to be sent to the signer 502 in a response 510 (e.g., a reply) to a request 506 for the state received by the computing device 500 from the signer 502.

Figure 6:
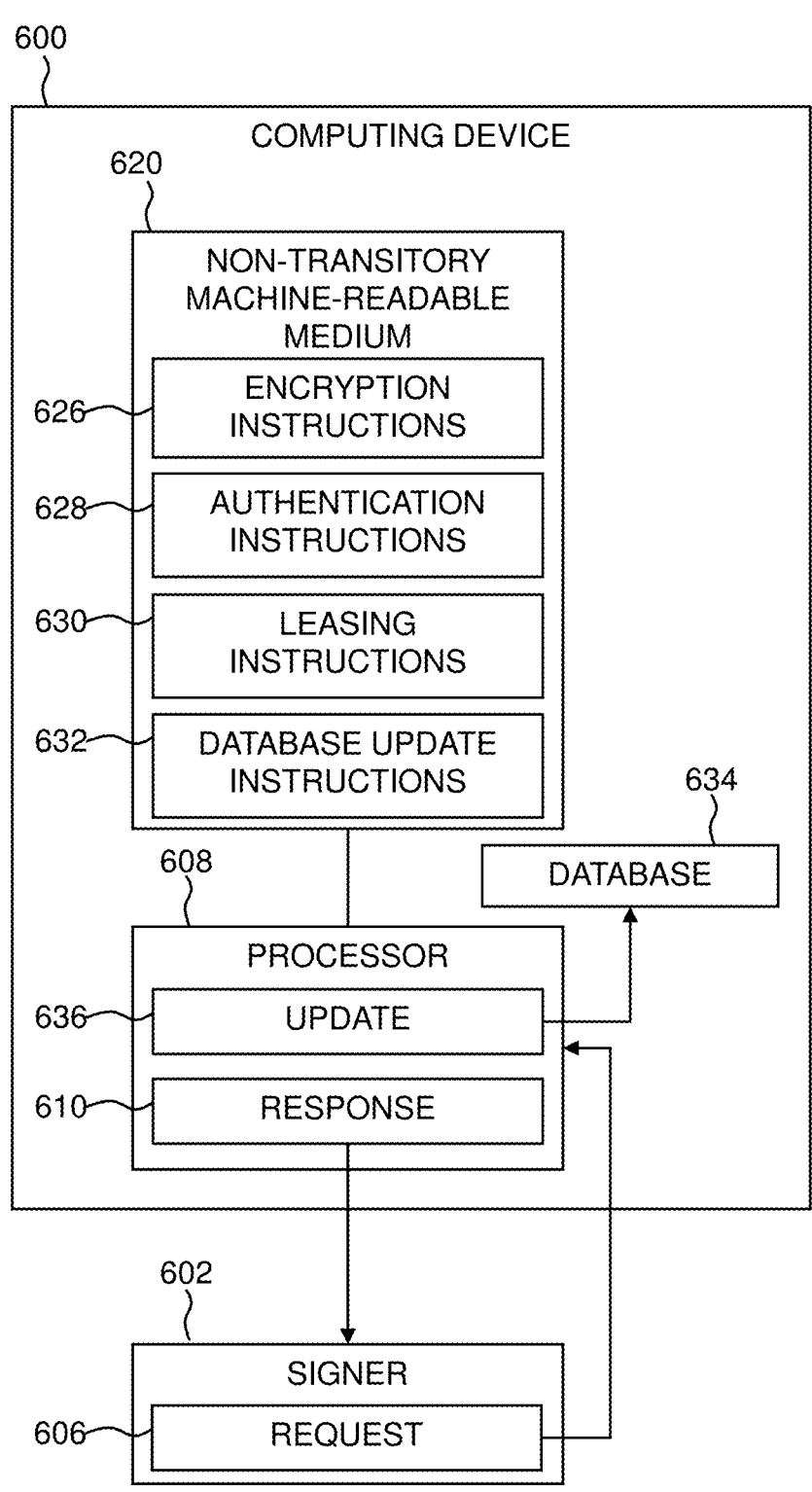
FIG. 6 is a schematic drawing of an example computing device to authorize a state in a stateful signature scheme.

FIG. 6 is a schematic drawing of an example computing device 600 to authorize a state in a stateful signature scheme. Reference numerals for features of the computing device 600 that are similar to or have corresponding functionality to features of the computing device 500 of FIG. 5 are incremented by 100. In this regard, the computing device 600 implements the same functionality as the computing device 500 and further functionality as described by the examples below.

The computing device 600 comprises a processor 608 and a non-transitory machine-readable medium 620. To also implement the functionality of the computing device 500 described above, the non-transitory machine-readable medium stores instructions comprising the instructions of the computing device 500 and further instructions as described below.

In some examples, the non-transitory machine-readable medium 620 stores encryption instructions 626. In some examples, the encryption instructions 626 are to encrypt the response 610 to the signer 602. Such encryption may be performed using an asymmetric or symmetric encryption scheme, depending on the implementation details (such as whether it is possible to share keys in a secret manner). In this manner, the authorized signer 602 can decrypt the response 610 (and retrieve the state) whereas another signer cannot decrypt and use the state.

In some examples, the non-transitory machine-readable medium 620 stores authentication instructions 628. In some examples, the authentication instructions 628 are to include a tag in the response 610 to allow the signer 602 to authenticate the response 610. In some examples, the tag comprises signature applied to the response 610. In some examples, the tag comprises a MAC. Thus, the signer 602 may decide whether to trust the response 610 depending on whether it can authenticate the response 610 (e.g., in case a device masquerading as the computing device 600 attempts to trick the signer 602 into signing a message using a previously used state).

In some examples, the non-transitory machine-readable medium 620 stores leasing instructions 630. In some examples, the response 610 comprises a lease (generated in accordance with the leasing instructions 630) indicating a condition under which the signer 602 is authorized to generate the signing key, and hence produce a signature. In some examples, the condition is a time period during which a state can be used by the signer 602.

In some examples, the leasing instructions 630 are to instruct the processor 608 to determine whether the lease is to be modified in response to a request 606 to modify the lease received from the signer 602. The leasing instructions 630 are to instruct a modified lease to be sent to the signer 602 in response determining that the lease is to be modified. The modified lease may indicate a modified condition (such as a different set of states authorized to be used and/or a different time period) under which the signer 602 is authorized to generate the signing key, and hence produce a signature.

In some examples, the non-transitory machine-readable medium 620 stores database update instructions 632. In some examples, the database update instructions 632 are to instruct an update 636 of a database 634 (e.g., a record such as a lookup table stored in the computing device 600, or a blockchain ledger) indicative of the set of states in response to determining that the available state has been used to generate the signing key (to produce a signature). The update 636 is to instruct the used state to be removed from the set of states.

In some examples, the update 636 may result in update of the database 634 in response to receiving an indication (e.g., via another request 606) from the signer 602 that the state has not been used to generate the signing key. In which case, providing the signer 602 can be trusted, the update 636 is to instruct readmission of the state in the database 634.

Figure 7:
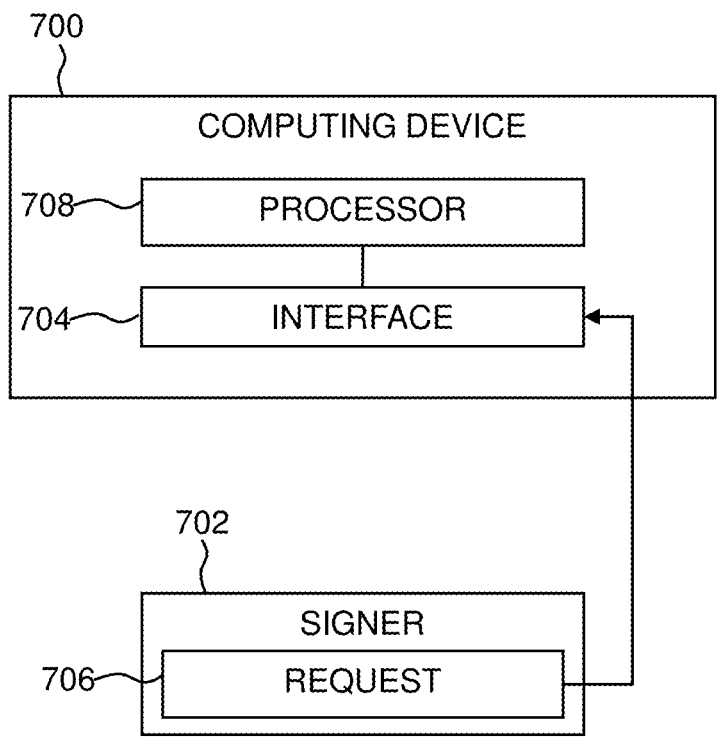
FIG. 7 is a schematic drawing of an example computing device to authorize a state in a stateful signature scheme.

FIG. 7 is a schematic drawing of an example computing device 700 to authorize a state in a stateful signature scheme. Reference numerals for features of the computing device 700 that are similar to or have corresponding functionality to features of the computing device 100 of FIG. 1 are incremented by 600. The computing device 700 may implement similar functionality to the computing device 100 (and provide similar technical results as described previously). Thus, further details of the features of the computing device 700 with similar functionality to the features of the computing device 100 can be understood with reference to the description of the computing device 100 and related examples.

The computing device 700 comprises an interface 704 and a processor 708.

The interface 704 is to receive a request 706 issued by a signer 702 that does not have a state to use as an input to generate a signing key under a stateful signature scheme. In some examples, the signer 702 may not have a sufficient number of states to use for the number of signatures it intends to produce. In either case, the signer's request 706 may indicate that it does not have a state to use and, in some examples, may indicate a number of states needed.

The processor 708 is to determine, in response to the request 706, an available state for the signer 702 to use as the input. The available state is identified from a set of states, managed by the computing device 700, to maintain statefulness of the stateful signature scheme. The available state is identified to ensure that states are not reused by any signer under the stateful signature scheme, thereby maintaining statefulness.

Figure 8:
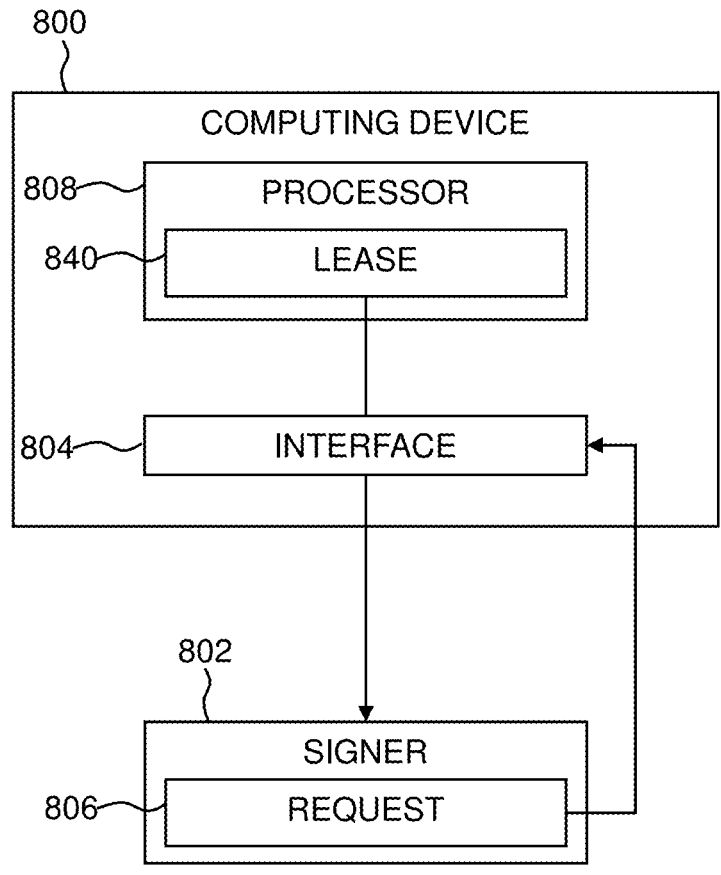
FIG. 8 is a schematic drawing of an example computing device to authorize a state in a stateful signature scheme.

FIG. 8 is a schematic drawing of an example computing device 800 to authorize a state in a stateful signature scheme. Reference numerals for features of the computing device 800 that are similar to or have corresponding functionality to features of the computing device 700 of FIG. 7 are incremented by 100. In this regard, the computing device 800 implements the same functionality as the computing device 700 and further functionality as described by the examples below.

The computing device 800 comprises an interface 804 and a processor 808.

In some examples, the request 806 comprises an indication of a number of states requested. In some examples, the request 806 comprises an indication of a requested time period over which the state is to be authorized for use as the input. In some examples, the request 806 comprises an indication of an authenticity of the request 806 to allow the computing device 800 to authenticate the request 806 prior to determining the available state. In some examples, the indication of authenticity may comprise a signature or MAC.

In some examples, processor 808 is to send a lease 840 (e.g., in a reply or response as referred to above) to the signer 802 via the interface 804. In some examples, the lease 840 comprises a number of available states that the signer 802 is authorized to use. In some examples, the lease 840 comprises a time period during which the available state is authorized to be used by the signer 802. In some examples, authentication data (such as a signature or MAC) to allow the signer 802 to authenticate the lease 840.

In some examples, the processor 808 is to send a modified lease 840 to the signer 802 in response to considering an additional request 806 received from the signer 802 to modify the lease 840. In some examples, the modified lease 840 may modify the number of available states (such as increase the number of states if the signer 802 needs more states for the number of signatures that are to be produced) that the signer 802 is authorized to use. In some examples, the modified lease 840 may modify the time period (such an extension to the originally leased time period) during which the available state is authorized to be used by the signer 802.

Any of the blocks, nodes, instructions or modules described in relation to the figures may be combined with, implement the functionality of or replace any of the blocks, nodes, instructions or modules described in relation to any other of the figures. For example, methods may be implemented as machine-readable media or computing devices, machine-readable media may be implemented as methods or computing devices, and computing devices may be implemented as machine-readable media or methods. Further, any of the functionality described in relation to any one of a method, machine readable medium or computing device described herein may be implemented in any other one of the method, machine readable medium or computing device described herein. Any claims written in single dependent form may be re-written, where appropriate, in multiple dependency form since the various examples described herein may be combined with each other.

Examples in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, flash storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing circuitry, or a module thereof, may execute the machine-readable instructions. Thus, functional nodes, modules or apparatus of the system and other devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computing device comprising:
an interface to receive a request from a signer for a state, wherein the state is to be used as an input to generate a key under a stateful signature scheme; and
a processor to:
identify an available state that the signer is authorized to use in response to the request received via the interface, wherein the available state is identified from a set of states that can be used by the signer to maintain statefulness of the stateful signature scheme;
select a state by selecting a state from the set of states;
instruct a reply to be sent to the signer via the interface, wherein the reply comprises an indication of the state that the signer is authorized to use; and
delete the selected state from the set of states in response to authorizing the selected state to be used by the signer.

2. The computing device of claim 1, wherein the selected state has not yet been used as the input by the signer under the stateful signature scheme.

3. The computing device of claim 1, wherein the computing device is a blockchain node to implement a blockchain, wherein the request comprises a blockchain transaction request and wherein the processor is to:
determine whether the blockchain transaction request satisfies a contract specified by the blockchain; and
in response to the contract being satisfied:
record the transaction request and blockchain state changes in a ledger of the blockchain;
reach consensus on a new version of the ledger through a protocol implemented by the blockchain; and
as a result, authorize the signer to use the identified state.

4. The computing device of claim 1, wherein the processor is to:
determine a time period during which the signer is authorized to use the available state; and
indicate the time period with the reply.

5. The computing device of claim 1, wherein the processor is to:

after authorizing the signer to use the available state, determine that the authorization to use the available state is to be withdrawn; and send an instruction to the signer via the interface to instruct the signer to exclude the available state from future use as the input.

6. A non-transitory machine-readable medium storing instructions readable and executable by a processor of a computing device to:

determine an available state that a signer is authorized to use as an input to generate a signing key under a stateful signature scheme, wherein the available state is determined to be authorized if the available state belongs to a set of states that:

have not been authorized for use by any signer under the stateful signature scheme; and instruct an indication of the available state to be sent to the signer in a response to a request for the state received by the computing device from the signer;

wherein the processor is to instruct an update of a database indicative of the set of states in response to determining that the available state has been used to generate the signing key, wherein the update is to instruct the used state to be removed from the set of states.

7. The non-transitory machine-readable medium of claim 6, wherein the processor is to encrypt the response to the signer.

8. The non-transitory machine-readable medium of claim 6, wherein the processor is to include a tag in the response to allow the signer to authenticate the response.

9. The non-transitory machine-readable medium of claim 6, wherein the response comprises a lease indicating a condition under which the signer is authorized to generate the signing key.

10. A computing device comprising:

an interface to receive a request issued by a signer that does not have a state to use as an input to generate a signing key under a stateful signature scheme; and a processor to determine, in response to the request, an available state for the signer to use as the input, wherein the available state is identified from a set of states, managed by the computing device, to select a state by selecting a state from the set of states, and to delete the selected state from the set of states in response to authorizing the selected state to be used by the signer to maintain statefulness of the stateful signature scheme.

11. The computing device of claim 10, wherein the request comprises an indication of:

a number of states requested;

a requested time period over which the state is to be authorized for use as the input;

an authenticity of the request to allow the computing device to authenticate the request prior to determining the available state, or a combination thereof.

12. The computing device of claim 10, wherein the processor is to send a lease to the signer via the interface, wherein the lease comprises:

a number of available states that the signer is authorized to use;

a time period during which the available state is authorized to be used by the signer;

authentication data to allow the signer to authenticate the lease, or a combination thereof.

13. The computing device of claim 12, wherein the processor is to send a modified lease to the signer in response to considering an additional request received from the signer to modify the lease, wherein the modified lease is to modify:

the number of available states that the signer is authorized to use;

the time period during which the available state is authorized to be used by the signer, or a combination thereof.

14. The computing device of claim 1, wherein a coordinator and the signer have an asymmetric signing key pair.

15. The computing device of claim 1, wherein a record of all available states for the stateful signature scheme is maintained in a lookup table.

16. The computing device of claim 15, wherein the states maintained in the lookup table are labeled as on lease.

17. The computing device of claim 16, wherein the lookup table indicates a time when the lease expires, which signer leased each state, and, for each state in a lease set, other states included in the lease set.

18. The computing device of claim 1, wherein responsive to a lease expiring, each state in a set states available for use during the lease is indicated as being used.

* * * * *